(12) United States Patent
Giesselmann

(10) Patent No.: US 11,409,679 B2
(45) Date of Patent: Aug. 9, 2022

(54) SYSTEM COMPONENT AND USE OF A SYSTEM COMPONENT

(71) Applicant: Robert Bosch GmbH, Stuttgart (DE)

(72) Inventor: Timo Giesselmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/240,065

(22) Filed: Apr. 26, 2021

(65) Prior Publication Data
US 2021/0349843 A1 Nov. 11, 2021

(30) Foreign Application Priority Data
May 7, 2020 (DE) .......................... 102020205765.6

(51) Int. Cl.
G06F 13/362 (2006.01)
G06F 13/30 (2006.01)
G06F 9/30 (2018.01)
G06F 13/42 (2006.01)

(52) U.S. Cl.
CPC ........ *G06F 13/362* (2013.01); *G06F 9/30101* (2013.01); *G06F 9/30189* (2013.01); *G06F 13/30* (2013.01); *G06F 13/4282* (2013.01)

(58) Field of Classification Search
CPC .... G06F 13/362; G06F 13/4282; G06F 13/30; G06F 9/30189; G06F 9/30101
See application file for complete search history.

(56) References Cited

U.S. PATENT DOCUMENTS

| | | | | |
|---|---|---|---|---|
| 7,254,657 B1* | 8/2007 | Lanfield | ............. | G06F 13/4217 710/309 |
| 10,430,225 B1* | 10/2019 | Harland | ............. | G06F 9/45558 |
| 2008/0162835 A1* | 7/2008 | Wilson | ............... | G06F 3/04166 711/155 |
| 2018/0329837 A1* | 11/2018 | Mishra | ................ | G06F 13/4282 |
| 2019/0065426 A1* | 2/2019 | Das Sharma | ....... | G06F 13/4282 |

FOREIGN PATENT DOCUMENTS

CN 111105743 A 5/2020

* cited by examiner

*Primary Examiner* — Zachary K Huson
(74) *Attorney, Agent, or Firm* — Norton Rose Fulbright US LLP; Gerard Messina

(57) ABSTRACT

A system component, including an interface for a data bus, a defined communication protocol being used on the data bus which determines the data sequence of access requests for sending and receiving data. The data of an access request includes pieces of information about the access direction. The system component includes a register unit including data registers. The system component includes a processing unit for the data of an access request. The interface is optionally operable in a first or a second operating mode. In the first operating mode, the data of an access request is supplied to the register unit to identify a register address, so that the corresponding read or write access takes place on the identified data register. In the second mode, the data of an access request is supplied to the processing unit and the corresponding read or write access is handled by the processing unit.

10 Claims, 6 Drawing Sheets

FIG. 3a1) 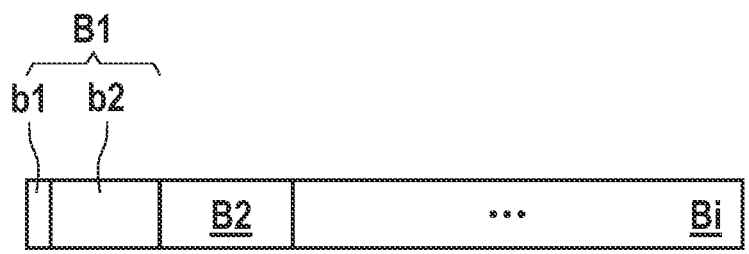
FIG. 3a2) 
FIG. 3b1) 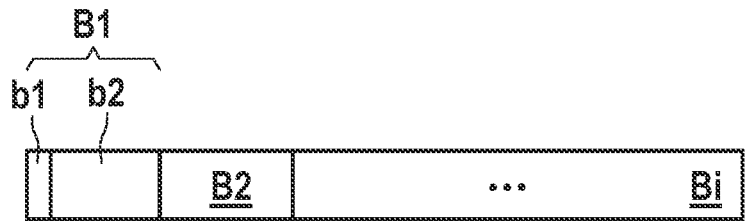
FIG 3b2) 
FIG. 3c1) 
FIG. 3c2) 

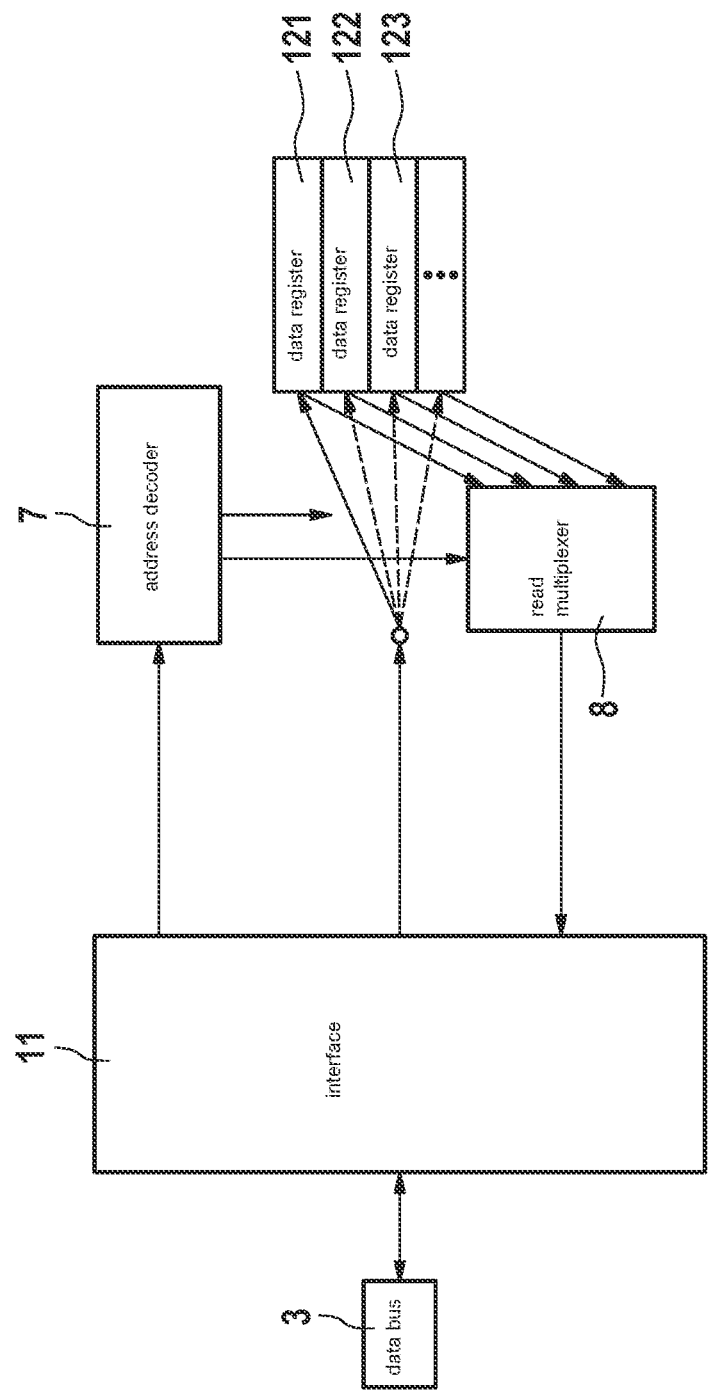

SYSTEM COMPONENT AND USE OF A SYSTEM COMPONENT

CROSS REFERENCE

The present application claims the benefit under 35 U.S.C. § 119 of German Patent Application No. DE 102020205765.6 filed on May 7, 2020, which is expressly incorporated herein by reference in its entirety.

FIELD

The present invention relates to a system component of a system and a use of a system component. Furthermore, the present invention relates to a system component of a system including at least one master and at least one slave which communicate via a data bus.

BACKGROUND INFORMATION

To enable the data exchange between integrated circuits, various communication protocols may be used. The inter-integrated circuit (I²C) enables a master-slave communication, an integrated circuit acting as a master and requesting a data access to another integrated circuit (slave). The data access may include both writing and also reading one or multiple bytes. For this purpose, one master and multiple slaves are typically located on an I²C bus, systems including multiple masters, so-called multimaster buses, also being conventional, however.

Unique slave addresses are assigned to the individual slaves, which enable the master to address the different slaves on the bus independently of one another. During the data access, in addition to this unique slave address, pieces of information are 102240352.1 transmitted as to whether a write or read access is to take place. Furthermore, data bytes which represent the actual payload of the data access may be transmitted.

The access to the register of the slave takes place via an interface. According to a first procedure, the register address may be evaluated directly by the logic of the interface, so that the register is accessed in hardware. According to a second procedure, the register address is not evaluated by the logic of the interface, but transmitted to a microcontroller which interprets the register address. This second procedure is therefore an implementation in software.

The first procedure enables an efficient and power saving implementation, the register set being fixed, however. The second procedure is more flexible, but typically requires a greater system expenditure, for example by providing the microcontroller.

SUMMARY

The present invention provides a system component and a use of a system component.

Preferred specific embodiments of the present invention are disclosed herein.

According to a first aspect, the present invention accordingly relates to a system component, including an interface for a data bus for communication with at least one further system component, a defined communication protocol being used on the data bus which determines the data sequence of access requests for sending and receiving data, and the data of an access request including at least pieces of information about the access direction—read or write access. Furthermore, the system component includes a register unit having multiple data registers, which are addressable via register addresses and are readable and/or writable via the data bus, the register unit interpreting specific data of an access request on the basis of the data sequence as a register address. Finally, the system component includes a processing unit for processing the data of an access request, the interface optionally being operable in a first or a second operating mode, in the first operating mode the data of an access request being supplied to the register unit to identify a register address, so that the corresponding read or write access takes place on the data register thus identified, and in the second operating mode the data of an access request being supplied to the processing unit and the corresponding read or write access being handled by the processing unit.

According to a second aspect, the present invention relates to the use of a system component according to the present invention as a slave in a system which includes at least one master and at least one slave, master and slave communicating with one another via a data bus and a defined communication protocol being used on the data bus.

In accordance with an example embodiment of the present invention, in that the interface may be operated in two different operating modes, it is possible to switch flexibly between a fixed register list and a flexible register list depending on the application. For example, a slave may both be implemented efficiently using hardware logic including a fixed register set, and also designed to let itself be configured to an arbitrary I²C protocol. The interface may thus be switched between the two methods depending on the application, so that the advantages of the particular method may be used in a single item of hardware.

The fixed register list corresponds to the first operating mode, the register address being identified directly by the register unit. The flexible register list corresponds to the second operating mode, the processing unit carrying out the read or write access on the basis of the data of the access request. The register address is not evaluated by the logic of the interface in the case of the flexible register list, but handled as a normal data byte of the payload. For example, a microcontroller may evaluate the payload as a processing unit and interpret the first byte as the register address. The access to different registers or resources may thus be enabled in software. The possibility also results due to the implementation in software of interpreting the payload differently, for example by using 2 bytes as the register address, or no register address at all. The first operating mode enables the efficient and power-saving implementation of the addressing of the data registers, while the second operating mode enables a flexible implementation of the access to the data registers.

The system component is universally usable due to the use of different operating modes, so that various applications may be covered.

According to one refinement of the system component in accordance with the present invention, the register unit is designed in such a way that the read or write access takes place in a hardware-based manner in the first operating mode of the interface. This is to be understood to mean that the register address is evaluated directly by the logic of the register unit. Therefore, the corresponding data register is accessed directly by a corresponding hardware switch, so that the system component may be operated in a very power-saving manner.

According to one refinement of the system component in accordance with the present invention, the register unit is designed in such a way that the read or write access takes place in a software-based manner in the second operating mode of the interface. The processing unit may thus evaluate the data sequence of the access request in a software-based manner in order to ascertain the register address.

According to one refinement of the system component in accordance with the present invention, the processing unit is designed to interpret in an interrupt-driven manner the data of access requests in packets in the second operating mode of the interface and in the case of a write access to accept the data of the access request and in the case of a read access to provide the requested data. In particular, an interrupt may be sent to the processing unit after each transmitted byte in order to process the byte.

According to one refinement of the system component in accordance with the present invention, the processing unit is associated with a data memory including a memory direct access unit, a direct memory access, a DMA controller, in the second operating mode of the interface, in the case of a write access, the data of access requests being stored by the DMA controller in this data memory, so that the processing unit may access these. The processing unit provides data in this data memory which are read out from this data memory by the DMA controller in the case of a read access. The processing unit may thus process multiple bytes after the transmission thereof.

According to one refinement of the system component in accordance with the present invention, the processing unit is coupled, optionally via the DMA controller, to at least one selected data register of the register unit, so that a read or write access takes place via the register unit and the at least one selected data register when the interface is operated in the second operating mode. It is thus also possible in the second operating mode to access a selected data register directly.

According to one refinement of the system component in accordance with the present invention, the processing unit is coupled, optionally via the DMA controller, to at least one first selected data register, via which read accesses take place, and to at least one second selected data register, via which write accesses take place, when the interface is operated in the second operating mode. Different data registers are thus associated with the different types of access in order to simplify the access.

According to one refinement of the system component in accordance with the present invention, the register unit interprets the data of an access request according to a first communication protocol. The processing unit is programmable in such a way that it interprets the data of an access request as read or write accesses of a second communication protocol and handles them accordingly. The selection of the first or second operating mode for the interface is dependent on whether the first or second communication protocol is used on the data bus, via which the system component communicates with further system components. The present invention is thus usable flexibly for various communication protocols.

According to one refinement of the system component in accordance with the present invention, the register unit and/or the processing unit interprets the data of an access request in accordance with a communication protocol which meets the I²C standard. The slave address may include 7 bits, for example, and is unique on the data bus. Multiple bytes may be transmitted in the case of an I²C access, the first byte including the slave address and a read/write bit, which indicates the access direction (read access or write access), via which the master thus communicates whether a write access or read access is to take place. The first byte after the slave address may represent a register address, whereby it is made possible that an I²C access may access different registers in the slave. This may also be handled differently depending on the application, however. For example, 2 bytes may also be used as the register address. It may also be provided that no register address is implemented. After the (non-obligatory) transmission of the register address, one or multiple data bytes may optionally take place, which represent the actual payload of the access.

In the case of a read access, the last used register address of a write access may be used as the register address for the read access in the I²C protocol. If a register is to be read which was not written directly beforehand, which represents the normal case, first a write access without data bytes is carried out using this read register address. Therefore, only the address of the device and the register address are transmitted. Subsequently, the read access is carried out. The reading may also be implemented using fixed and also using flexible register lists, in that a memory is reserved for the last transmitted register address. In the case of the fixed register list, this may be implemented in hardware. In the case of the flexible register list, this may be implemented as a variable in software.

According to one refinement of the system component in accordance with the present invention, the register unit and/or the processing unit interprets the data of an access request in accordance with a communication protocol which meets the SPI standard. In the SPI protocol, the first byte including the slave address is typically omitted, this being replaced by one separate chip select signal per slave on the data bus. The first byte in the I²C protocol also contains, in addition to the slave address, the information about the access direction. In the SPI protocol, the access direction is transmitted together with the register address in the first byte of the access, whereby the register address is limited to 7 bytes. In the case of a fixed register list, the procedure may take place similarly to the I²C protocol, in consideration of the omission of the first byte (I²C slave address). The information about the access direction is therefore transmitted in the byte of the register address and is then valid for the data direction from the second byte. In the case of a flexible register list, the register address is not evaluated by the logic of the interface, but is handled as a normal data byte of the payload. The processing unit may evaluate the payload and interpret the first byte as the register address and thus enable the access to different registers or resources in software. Since the access direction does not have to be known at the beginning and may be evaluated downstream in the processing unit, for example, data may be received and sent simultaneously by the slave. This may be carried out by using two first-in-first-out memories (FIFOs) or DMA channels, or by a special FIFO, which fills redundant memory locations of sent bits with received bits.

According to one refinement of the present invention, the system component encompasses at least one sensor functionality, in particular encompassing at least one MEMS sensor element. These may be, for example optical sensors, magnetic field sensors, chemical sensors, moisture sensors, acoustic sensors, inertial sensors, or the like.

According to one refinement of the system component in accordance with the present invention, the selection of the operating mode is carried out once upon switching on and may be defined, for example, by a value in a memory for comparison parameters or via the level of an external connection.

According to one refinement of the system component in accordance with the present invention, the selection of the operating mode is carried out at the runtime of the system and may thus be dynamically changed. For example, after a boot procedure in the fixed mode it is possible to switch over to operation in the flexible mode.

BRIEF DESCRIPTION OF THE DRAWINGS

FIG. 3a1-3c2 show schematic representations of data sequences corresponding to a communication protocol which meets the SPI standard.

FIG. 4 shows a schematic block diagram of a part of a system including a system component according to another specific embodiment of the present invention.

In all figures, identical or functionally identical elements and devices are provided with the same reference numerals.

DETAILED DESCRIPTION OF EXAMPLE EMBODIMENTS

Figure 1:
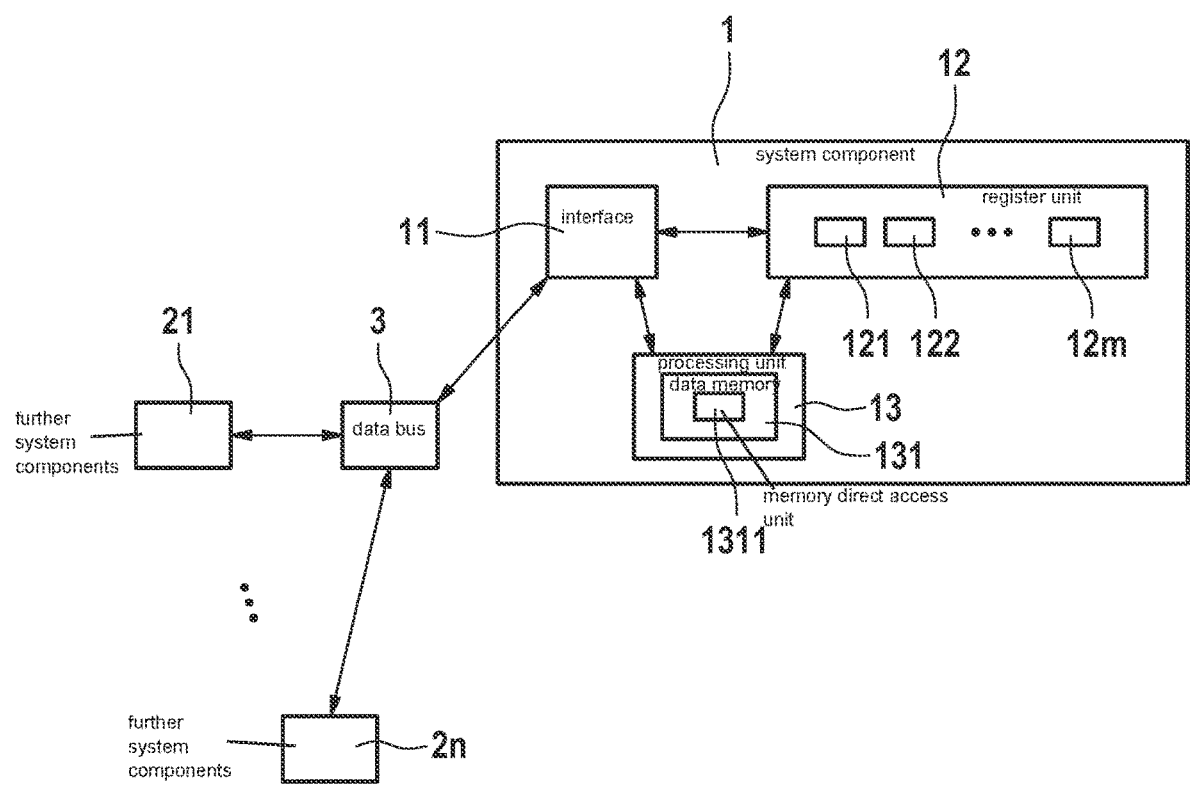
FIG. 1 shows a schematic block diagram of a system including a system component according to one specific embodiment of the present invention.

FIG. 1 shows a schematic block diagram of a system including a system component 1. System component 1 may be a slave device of the system, the system furthermore including a plurality of master devices as further system components 21 through 2n. The system may be part of a sensor, so that system component 1 may provide a sensor functionality. In particular, system component 1 may include a MEMS sensor element or may be coupled to a MEMS sensor element.

System component 1 includes an interface 11, which is coupled to a data bus 3 and is connected via this to further system components 21 through 2n. Further system components 21 through 2n may transmit access requests for sending and receiving data to interface 11 of system component 1 via a data bus 3. The access requests may also include the data to be transmitted.

A defined communication protocol is used on data bus 3, such as an I²C protocol or an SPI protocol. System component 1 is designed to interact with a data bus 3, which uses an arbitrary communication protocol from a variety of predefined communication protocols. System component 1 is thus usable in a variety of ways.

The communication protocol used on data bus 3 determines the data sequence of the access request for sending and receiving data, i.e., the interpretation of the sequence of the bytes. The data of the access request include pieces of information about the access direction. The access direction includes a read access and a write access.

Furthermore, system component 1 includes a register unit 12 including data registers 121 through 12m. Number m of the data registers is arbitrarily predefinable here and the present invention is not restricted to a certain number. Further system components 21 through 2n may access data registers 121 through 12m via data bus 3 and interface 11.

Furthermore, system component 1 includes a processing unit 13, which may process the data of the access request. Processing unit 13 may include a microcontroller. Processing unit 13 includes a data memory 131 having a memory direct access unit 1311. Processing unit 13 is optionally coupled to register unit 12.

Interface 11 may optionally be operated in a first operating mode or in a second operating mode. In the first operating mode, the data of the access request are supplied to register unit 12.

Register unit 12 identifies the register address on the basis of the access request in consideration of the communication protocol of data bus 3. The identification preferably takes place in hardware. Further system components 21 through 2n may subsequently read or write access the data register via data bus 3 and interface 11, which corresponds to the register address identified by register unit 12.

In the second operating mode, the data of the access request are transmitted without prior processing by interface 11 to processing unit 13. Processing unit 13 handles the read access or write access.

Furthermore, it may be provided that register unit 12 interprets the data of an access request in accordance with a first communication protocol. Processing unit 13 is programmed or programmable in such a way that it interprets the data of an access request as read or write accesses of a second communication protocol and handles them accordingly. The selection of the first or second operating mode for interface 11 is dependent on whether the first or second communication protocol is used on data bus 3, via which system component 1 communicates with further system components 21 through 2n.

Figure 2A:
FIG. 2a-2c show schematic representations of data sequences corresponding to a communication protocol which meets the I²C standard.

FIG. 2a)-2c) show schematic representations of data sequences corresponding to a communication protocol which meets the I²C standard. The data sequences are determined by the communication protocol used on data bus 3, in this case an I²C protocol.

FIG. 2a) shows a first possible data sequence according to the I²C protocol. The data sequence includes a plurality of bytes, a first byte B1 corresponding to the slave address, i.e., the address of system component 1 which further system component 21 through 2n wishes to access. A second byte B2 corresponds to the register address, i.e., that data register 121 through 12m of register unit 12 of system component 1 which further system component 21 through 2n wishes to access to read or write. Further bytes B3, Bi are optional and correspond to the data to be transmitted, i.e., the actual payload. The total number of bytes may be fixedly predefined, the present invention not being restricted to a specific number of bytes, which is expressed by the notation "Bi."

Figure 2B:
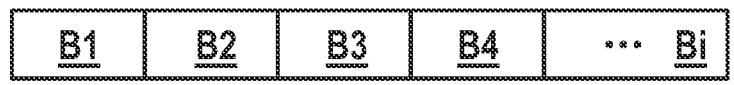

FIG. 2b) shows a second possible data sequence according to an HID-over-I²C protocol, first byte B1 again corresponding to the slave address. In this case, second byte B2 ("RegAddr Low") and third byte B3 ("RegAddr High") jointly specify the register address. Further bytes B4, Bi again correspond to the actual payload.

Figure 2C:

FIG. 2c) shows a third possible data sequence according to an I²C protocol, no register address being identified. First byte B1 again corresponds to the slave address, while further bytes B2, Bi correspond to the actual payload.

FIG. 3a1)-3c2) show schematic representations of data sequences corresponding to a communication protocol which meets the SPI standard.

FIG. 3a1), 3a2) show a possible data sequence according to the SPI protocol in the case of a write access with register address. FIG. 3a1) corresponds to the "Master Out Slave In"

signal (MOSI), the data being transferred from the master to the slave. A first byte B1 includes a first bit b1 here, which indicates whether it is a write access or a read access. Remaining bits b2 of the first byte indicate the register address. Further bytes B2, B1 correspond to the actual payload. FIG. 3a2) corresponds to the "Master In Slave Out" signal (MISO), the data being transferred from the slave to the master. In this case, bytes B1, B2, B1 are ignored.

FIG. 3b1), 3b2) show a possible data sequence according to the SPI protocol in the case of a read access with register address. FIG. 3b1) corresponds to the MOSI signal. A first byte B1 again includes a first bit b1, which indicates whether it is a write access or a read access. Remaining bits b2 of the first byte indicate the register address. Further bytes B2, B1 are ignored. FIG. 3b2) corresponds to the MISO signal. First byte B1 is ignored and further bytes B2, B1 correspond to the payload.

FIG. 3c1), 3c2) show a possible data sequence according to the SPI protocol in the case of a write/read access without register address. FIG. 3c1) corresponds to the MOSI signal. Bytes B1, B1 correspond to the write data. FIG. 3c2) corresponds to the MISO signal, bytes B1, B1 corresponding to the read data.

FIG. 4 shows a schematic block diagram of a part of a system including a system component, corresponding to an I²C interface with fixed register assignment. Interface 11, as described above, is connected to a data bus 3. Interface 11 is operated here in the first operating mode, so that the register address is read out directly by the logic of interface 11. In the case of writing, second byte B2 is provided to an address decoder 7, which may be part of above-described register unit 12. Address decoder 7 ascertains the register address. In the case of writing, further bytes B3, B1 are written into data register 121, 122, 123, . . . which corresponds to the register address ascertained by address decoder 7.

Furthermore, a read multiplexer 8 is provided, which in the case of a read access reads out second and further bytes B2, B1 from data registers 121, 122, 123, . . . and transfers them to interface 11.

Figure 5:
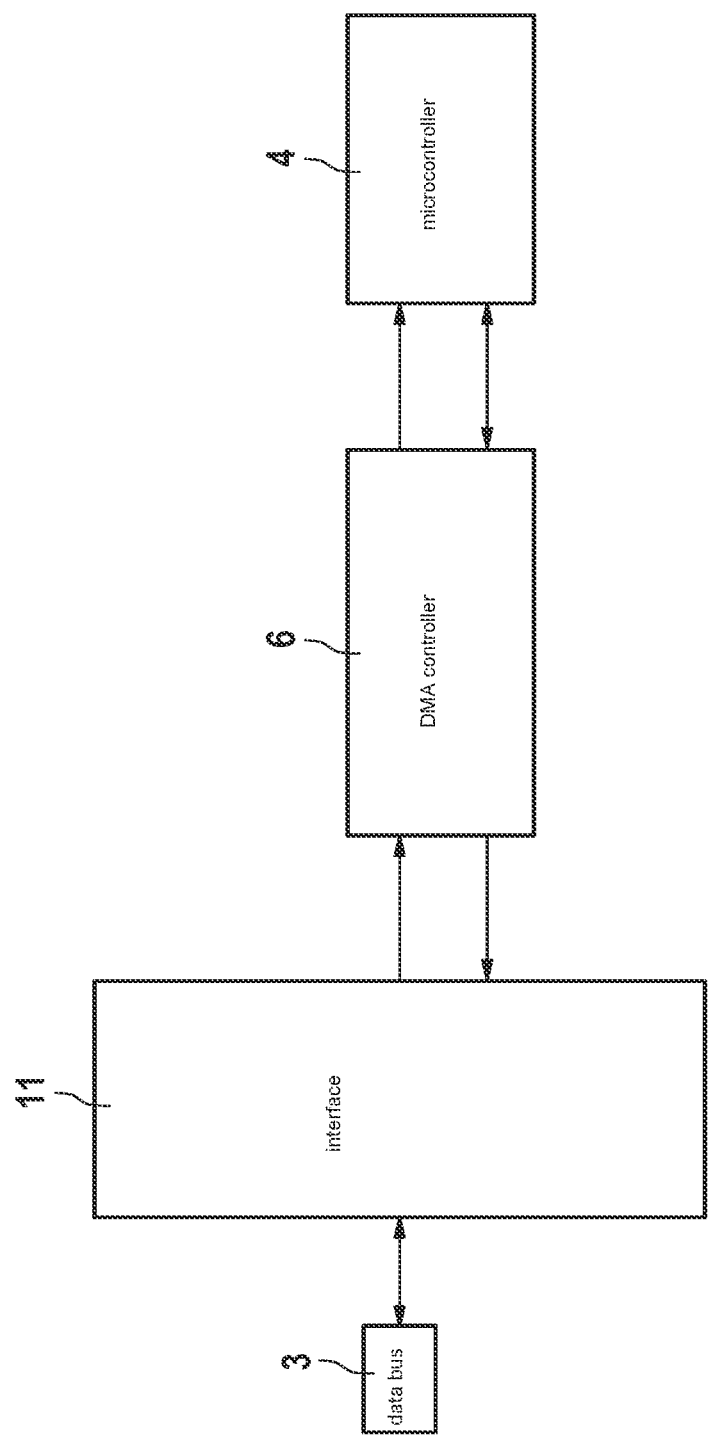
FIG. 5 shows a schematic block diagram of a part of a system including a system component according to another specific embodiment of the present invention.

FIG. 5 shows a schematic block diagram of a part of a system including a system component including a microcontroller 4 as a processing unit for processing the data. Interface 11, as described above, is connected to a data bus 3. Interface 11 is furthermore connected via a buffer register, FIFOs, or a DMA controller 6 to microcontroller 4.

In the second operating mode of interface 11, microcontroller 4 may interpret in an interrupt-driven manner the data of access requests in packets. In the case of a write access, microcontroller 4 accepts the data of the access request. In the case of a read access, microcontroller 4 provides the requested data.

If a DMA controller 6 is used, in the second operating mode of interface 11, in the case of a write access, the data of access requests are stored in a data memory, so that microcontroller 6 may access them. After buffering multiple bytes in the data memory, microcontroller 4 processes the transferred data. In the case of a read access, the data are read out from this data memory by microcontroller 4.

Figure 6:
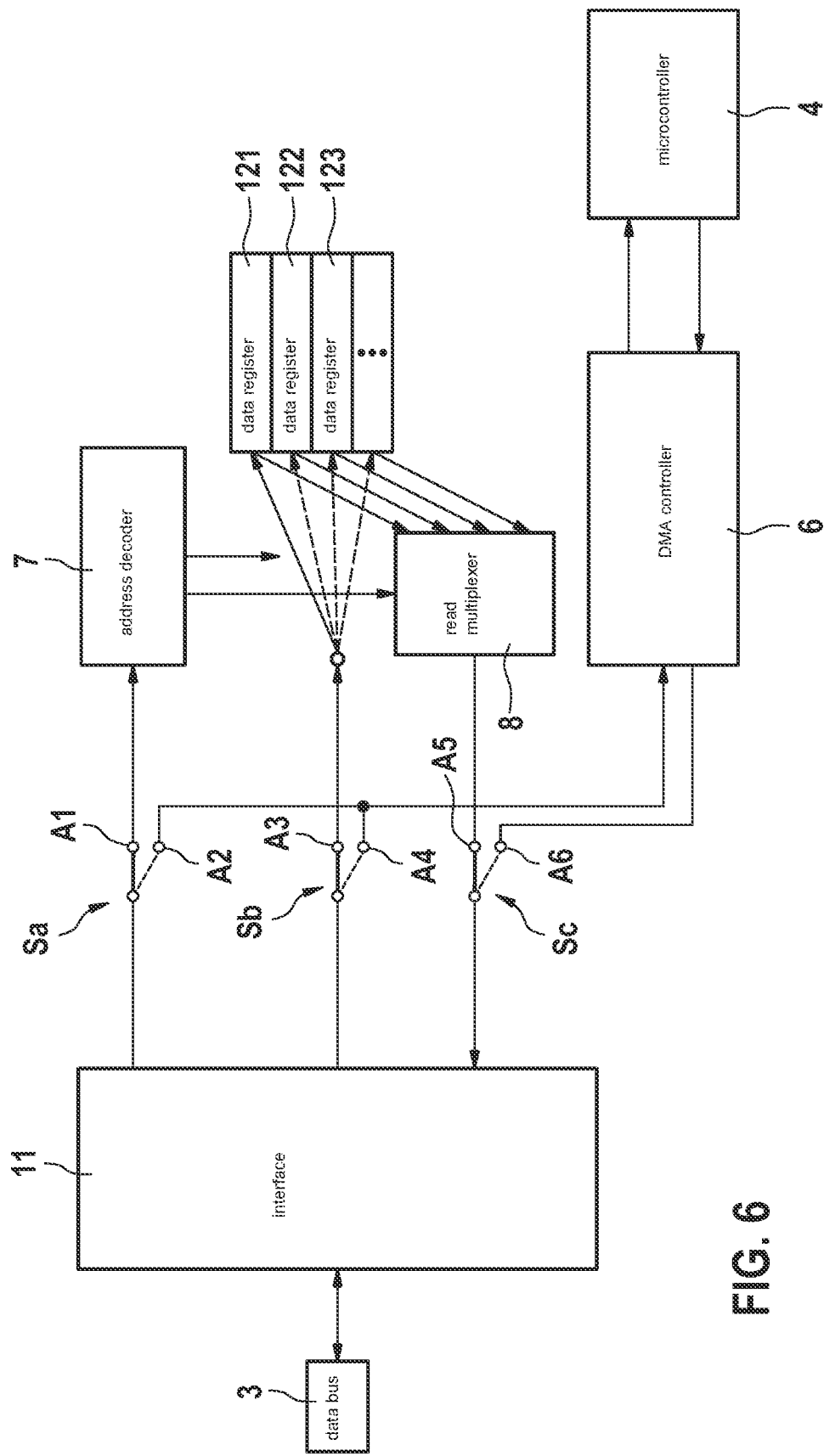
FIG. 6 shows a schematic block diagram of a part of a system including a system component according to another specific embodiment of the present invention.

FIG. 6 shows a schematic block diagram of a part of a system including a system component. Interface 11, as described above, is connected to a data bus 3. Furthermore, a microcontroller 4, a buffer register, FIFOs, or a DMA controller 6, an address decoder 7, a read multiplexer 8, and data registers 121, 122, 123, . . . are provided, as explained in the description of FIGS. 4 and 5. Three switching units Sa, Sb, Sc are provided, which are each switchable between a first switching state A1, A3, A5 and a second switching state A2, A4, A6. The first switching state corresponds to the first operating mode, the data access being carried out using data registers 121, 122, 123 . . . . The second switching state corresponds to the second operating mode, the data access being carried out using microcontroller 4.

Figure 7:
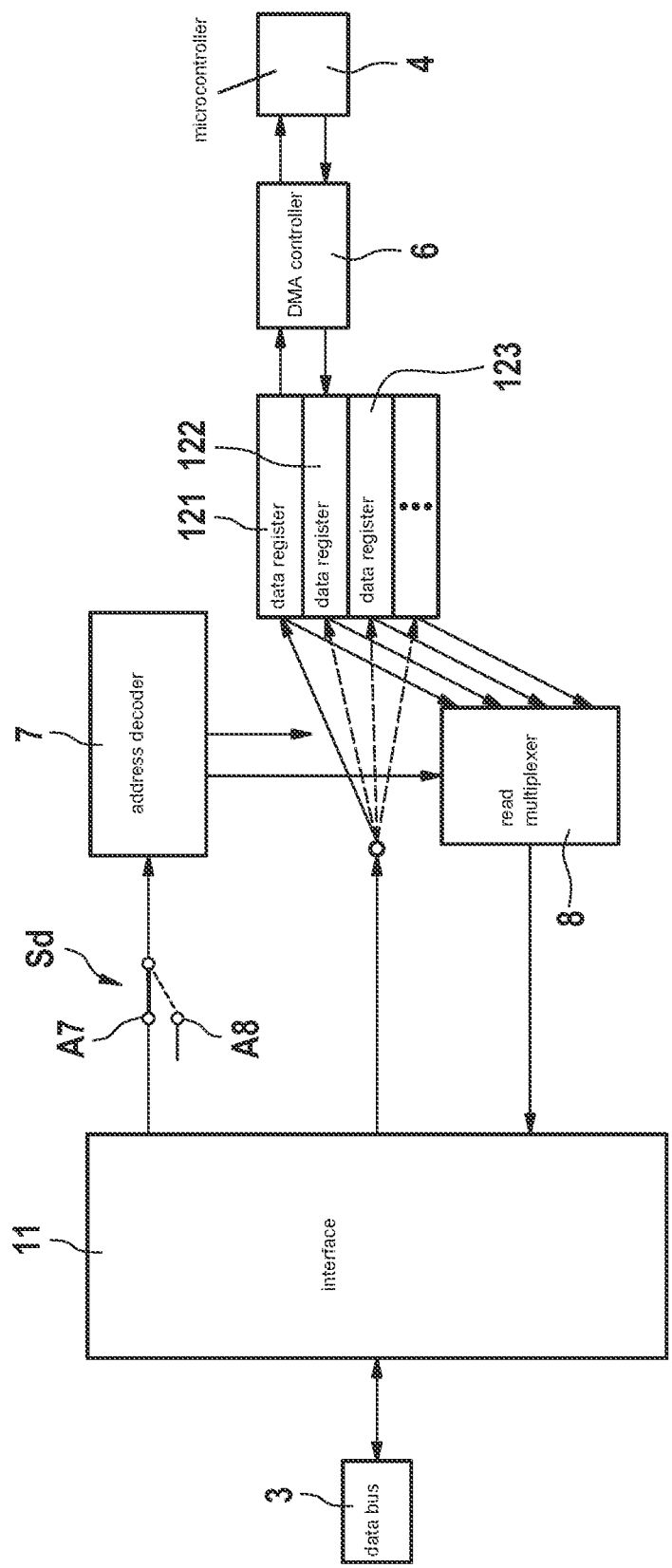
FIG. 7 shows a schematic block diagram of a part of a system including a system component according to another specific embodiment of the present invention.

FIG. 7 shows a schematic block diagram of a part of a system including a system component. Interface 11, as described above, is connected to a data bus 3. Microcontroller 4 is coupled via a buffer register, FIFOs, or a DMA controller 6 to first data register 121 and second data register 122. A read access takes place via first data register 121 and a write access takes place via second data register 122 when interface 11 is operated in the second operating mode. A switching unit Sd is switchable between a first switching state A7 and a second switching state A8. First switching state A7 corresponds to the first operating mode and second switching state A8 corresponds to the second operating mode. In the second operating mode, it is ascertained on the basis of the first byte whether a write access or a read access is to take place. The fixed register set, i.e., the data registers from the third data register, is switched off in this case. The write access takes place via first data register 121 using the DMA controller, FIFOs, or buffer register 6 and microcontroller 4. The read access takes place via second data register 122 using DMA controller, FIFOs, or buffer register 6 and microcontroller 4. In the second operating mode, the second byte of the access is then implementation-dependent ignored or used as the payload and all bytes from the third byte onward are processed as the payload. This variant has the advantage that switching between the two operating modes may possibly be implemented more simply.

What is claimed is:

1. A system component, comprising:
   a. an interface for a data bus for communication with at least one further system component,
      i. a defined communication protocol being used on the data bus, which determines a data sequence of access requests for sending and receiving data, and
      ii. wherein data of each access request of the access requests includes at least pieces of information about an access direction, the access direction being a read access or a write access;
   b. a register unit including multiple data registers addressable via register addresses and readable and/or writable via the data bus, the register unit interpreting certain of the data of each access request as a register address based on the data sequence; and
   c. a processing unit for the data of each access request;
   wherein the interface is optionally operable in a first operating mode or a second operating mode, in the first operating mode, the data of an access request of the access requests is supplied to the register unit to identify a register address, so that a corresponding read or write access takes place on the data register addressable by the register address, and in the second operating mode, the data of the access request is supplied to the processing unit and the corresponding read or write access is handled by the processing unit.

2. The system component as recited in claim 1, wherein the register unit is configured in such a way that the corresponding read or write access in the first operating mode of the interface is carried out in a hardware-based manner.

3. The system component as recited in claim 1, wherein the processing unit is configure to, in the second operating mode of the interface, interpret in an interrupt-driven manner the data of access requests in packets and, in the case of a write access, to accept the data of the access request and, in the case of a read access, to provide requested data.

4. The system component as recited in claim 1, further comprising:
a data memory including a direct memory access (DMA) controller, which is associated with the processing unit, wherein, in the second operating mode of the interface, in the case of a write access, the data of the access request are stored by the DMA controller in the data memory, so that the processing unit may access the data of the access request, and the processing unit provides data in the data memory, which in the case of a read access, may be read out from the data memory by the DMA controller.

5. The system component as recited in claim 1, wherein the processing unit is coupled to at least one selected data register of the register unit, so that a read or write access takes place via the register unit and the at least one selected data register, if the interface is operated in the second operating mode.

6. The system component as recited in claim 5, wherein the processing unit is coupled to at least one first selected data register, via which read accesses take place, and to at least one second selected data register, via which write accesses take place, when the interface is operated in the second operating mode.

7. The system component as recited in claim 1, wherein the register unit interprets the data of each access request in accordance with a first communication protocol and the processing unit is configured in such a way that the processing unit interprets the data of each access request as read or write accesses of a second communication protocol and handles them accordingly, and a selection of the first or second operating mode for the interface is dependent on whether the first or second communication protocol is used on the data bus, via which the system component communicates with further system components.

8. The system component as recited in claim 1, wherein the register unit and/or the processing unit interprets the data of an access request in accordance with a communication protocol which meets the $I^2C$ standard.

9. The system component as recited in claim 1, further comprising at least one MEMS sensor element.

10. A method of using a system component, comprising:
providing, in a system which includes at least one master and at least one slave, the system component as the slave, the system component including:
a. an interface for a data bus for communication with at least one further system component,
i. a defined communication protocol being used on the data bus, which determines a data sequence of access requests for sending and receiving data, and
ii. data of each access request of the access requests includes at least pieces of information about an access direction, the access direction being a read access or a write access;
b. a register unit including multiple data registers addressable via register addresses and readable and/or writable via the data bus, the register unit interpreting certain of the data of each access request as a register address based on the data sequence; and
c. a processing unit for the data of each access request;
wherein the interface is optionally operable in a first operating mode or a second operating mode, in the first operating mode, the data of an access request of the access requests is supplied to the register unit to identify a register address, so that a corresponding read or write access takes place on the data register addressable by the register address, and in the second operating mode, the data of the access request is supplied to the processing unit and the corresponding read or write access is handled by the processing unit;
communicating between the master and the slave via the data bus.

\* \* \* \* \*